Figure 7:
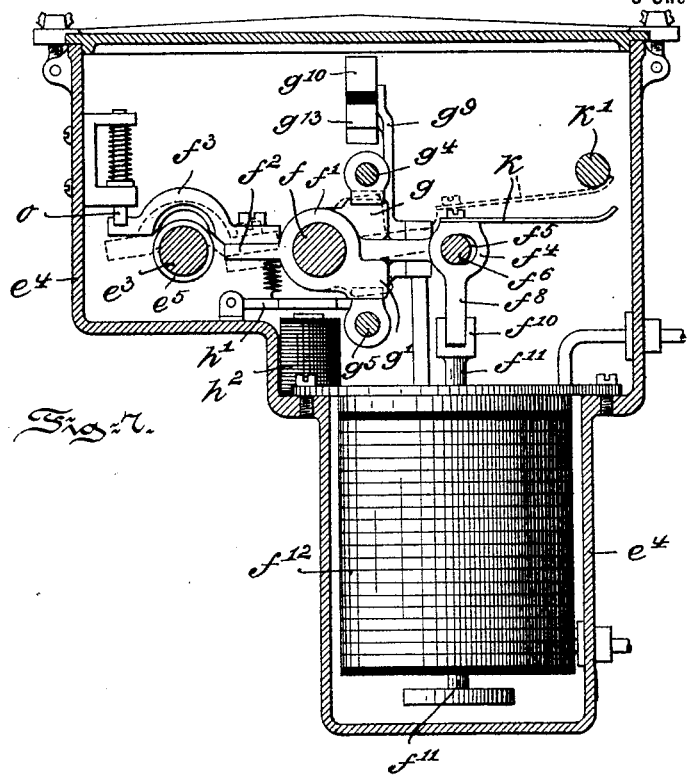

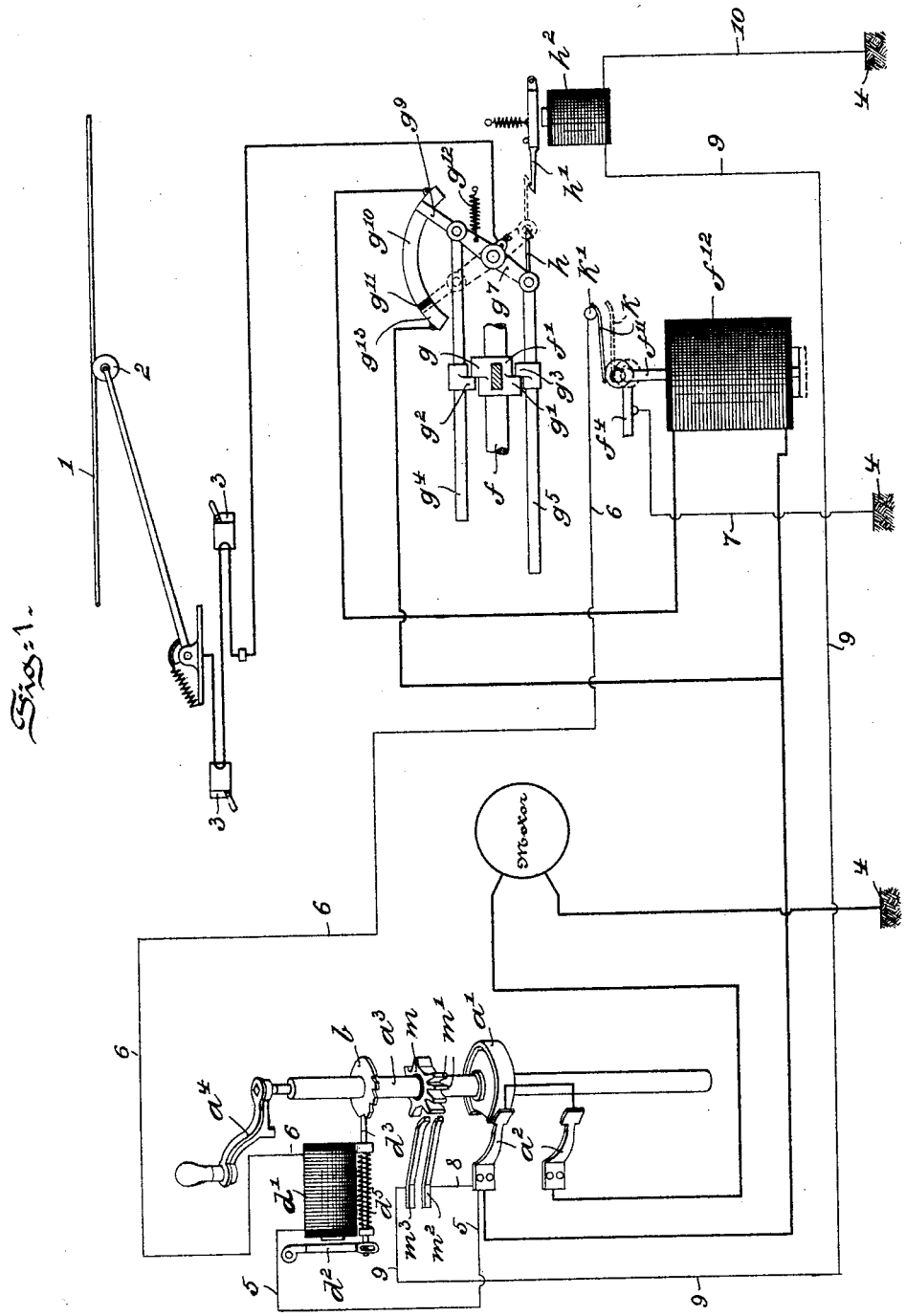

No. 640,749. Patented Jan. 9, 1900.
W. H. CONRAD.
CONTROLLER OPERATING MECHANISM.
(Application filed Nov. 1, 1899.)
(No Model.) 6 Sheets—Sheet 2.
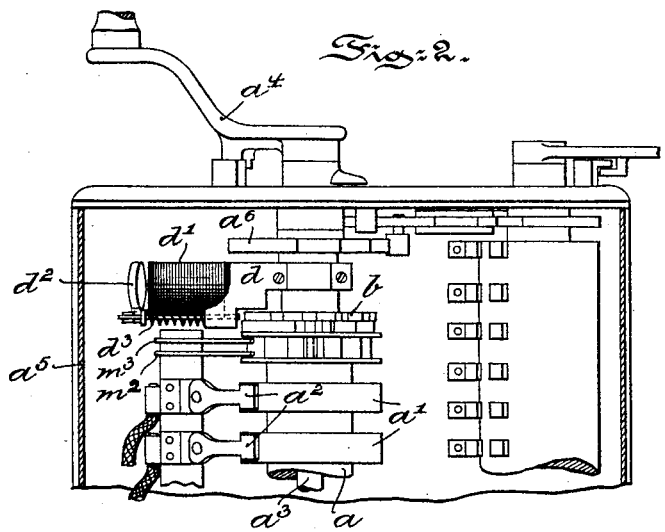
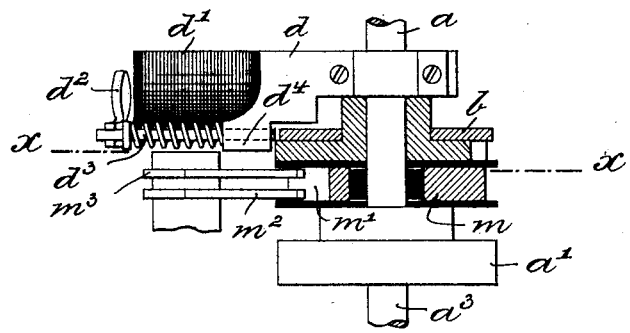
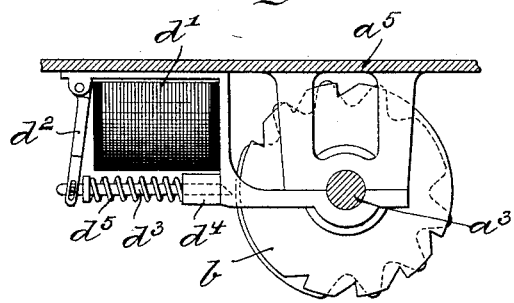
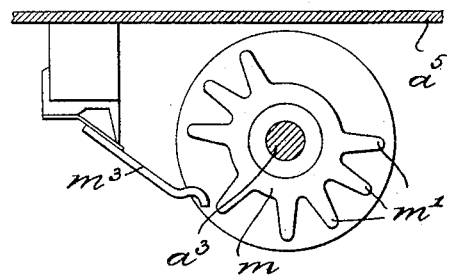
Witnesses:
Thomas M. Smith
Richard C. Maxwell
Inventor:
William H. Conrad,
By J. Walter Douglass
Attorney.
THE NORRIS PETERS CO., PHOTO-LITHO., WASHINGTON, D. C.

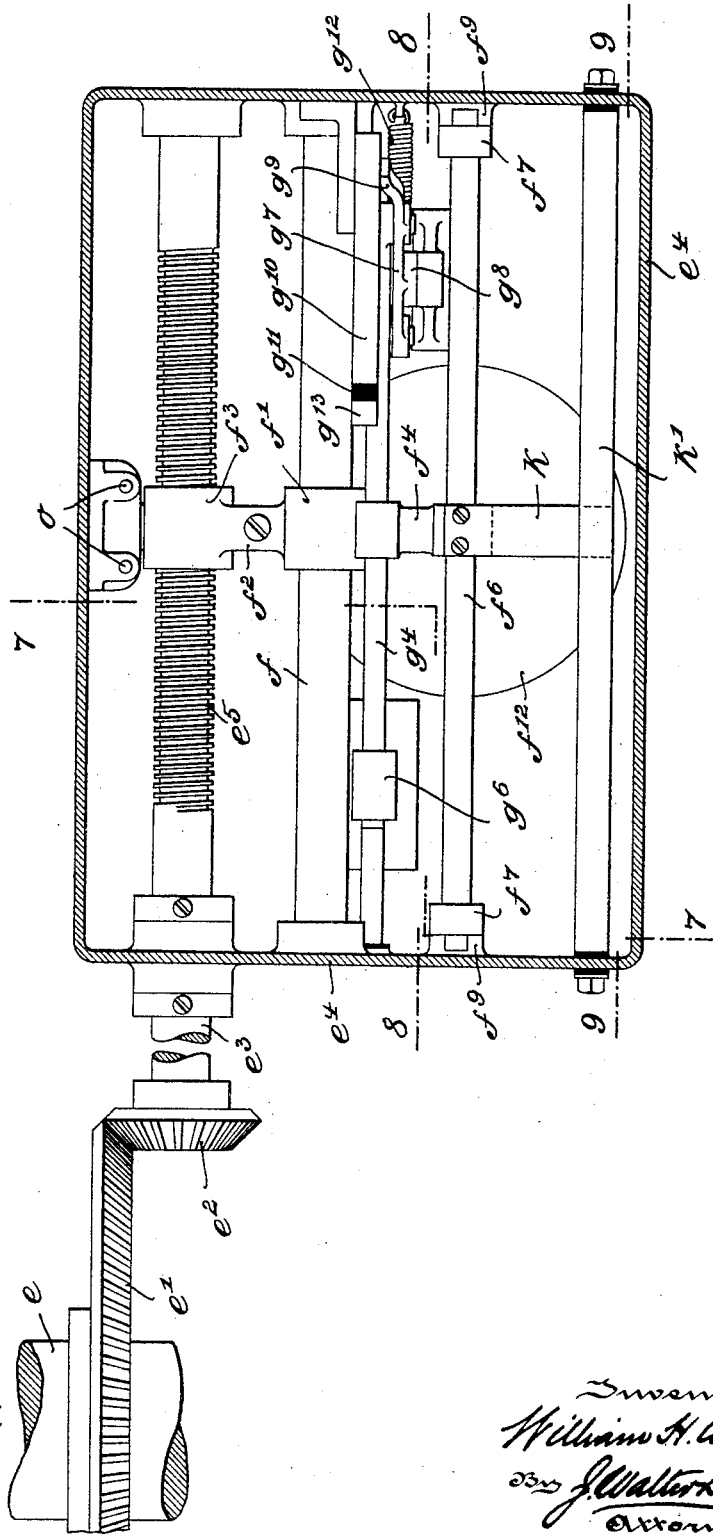

No. 640,749. Patented Jan. 9, 1900.
W. H. CONRAD.
CONTROLLER OPERATING MECHANISM.
(Application filed Nov. 1, 1899.)

(No Model.) 6 Sheets—Sheet 4.

Witnesses:
Thomas M. Smith.
Richard C. Maxwell

Inventor:
William H. Conrad,
By J. Walter Douglas
Attorney.

No. 640,749. Patented Jan. 9, 1900.
W. H. CONRAD.
CONTROLLER OPERATING MECHANISM.
(Application filed Nov. 1, 1899.)
(No Model.) 6 Sheets—Sheet 5.
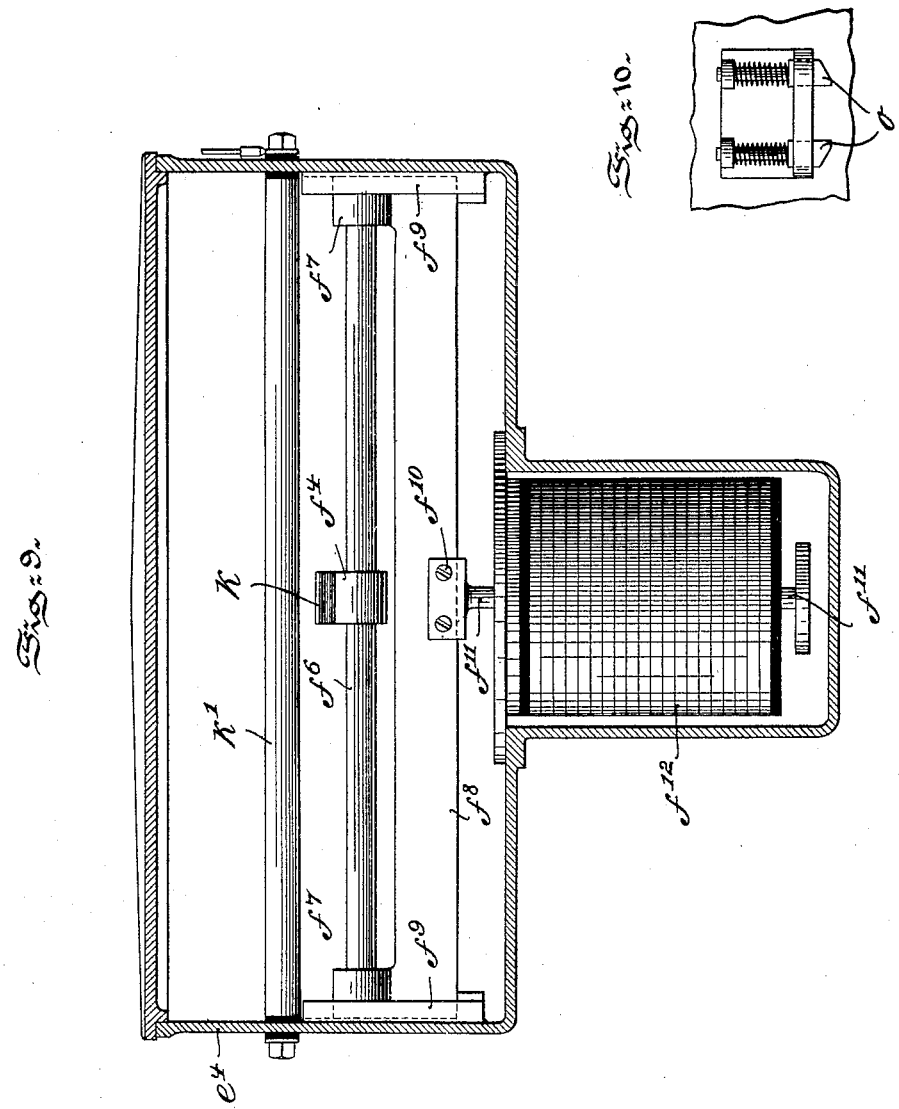

No. 640,749. Patented Jan. 9, 1900.
W. H. CONRAD.
CONTROLLER OPERATING MECHANISM.
(Application filed Nov. 1, 1899.)
(No Model.) 6 Sheets—Sheet 6.
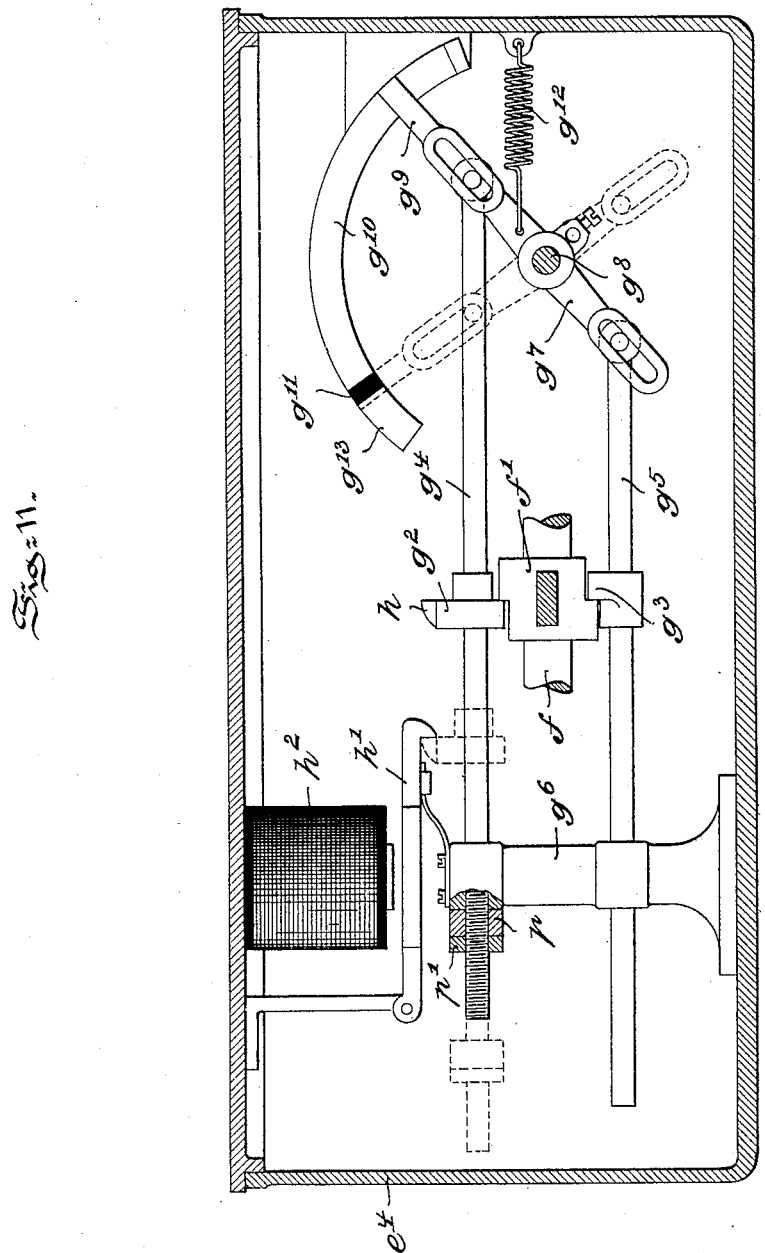

UNITED STATES PATENT OFFICE.

WILLIAM H. CONRAD, OF PHILADELPHIA, PENNSYLVANIA.

CONTROLLER-OPERATING MECHANISM.

SPECIFICATION forming part of Letters Patent No. 640,749, dated January 9, 1900.

Application filed November 1, 1899. Serial No. 735,467. (No model.)

*To all whom it may concern:*

Be it known that I, WILLIAM H. CONRAD, a citizen of the United States, residing at the city of Philadelphia, in the county of Philadelphia and State of Pennsylvania, have invented certain new and useful Improvements in Controller-Operating Mechanism, of which the following is a specification.

My invention has relation to mechanism whereby the operating-handle of a controller for electric cars and the like may be automatically locked and released and its movement controlled by the variations in speed of the car; and in such connection it relates more particularly to the construction and arrangement of such a mechanism.

Ordinarily the controller of an electrically-propelled vehicle, consisting of the usual revolving cylinder provided with insulated metallic contact-bands has been rotated or revolved in one direction by means of a handle actuated by the operator to bring the contact-bands into contact with contact-fingers to effect the various well-known combinations of rheostat, armature, and field connections. Upon the cap or cover of the controller was provided marks to indicate the successive positions the handle should be moved to revolve the cylinder so as to accelerate the motor of the car and to bring the same to full speed. If the operator was careless or unskilled, the handle was moved by him over these points so rapidly that the car could not gain sufficient speed to respond to the increased acceleration of its motor, and hence a great and useless expenditure of current or energy resulted and the motor was subjected to sudden and unusual strains.

The object of my present invention is to provide a mechanism which shall permit the handle of the controller to be moved by the operator from point to point and to be locked at each point until the speed of the car has been sufficiently accelerated, when the handle is automatically released to permit of a successive movement of the handle.

A further object of the invention is to so arrange this mechanism that the handle of the controller may at all times be moved backward by the operator to shut off the current, but cannot be moved forward a greater distance by the operator than is indicated by or commensurate with the speed of the car.

In the carrying out of my invention there is provided upon the shaft of the controller a notched disk, into which a pin or pawl is adapted to be projected and from which it is adapted to be retracted to thereby either lock the disk and shaft and prevent their turning in one direction or to unlock said disk and shaft and permit of their rotation. The pin or pawl is preferably controlled by a spring normally tending to retract the pin or pawl and by an electromagnet adapted when energized to project the pin or pawl into engagement with the teeth of the disk. The electromagnet is adapted to be energized or deënergized by the mechanism hereinafter more particularly described, the mechanism being controlled by the speed or travel of the car.

The nature and scope of my invention will be more fully understood from the following description, taken in connection with the accompanying drawings, forming part hereof, in which—

Figure 8:
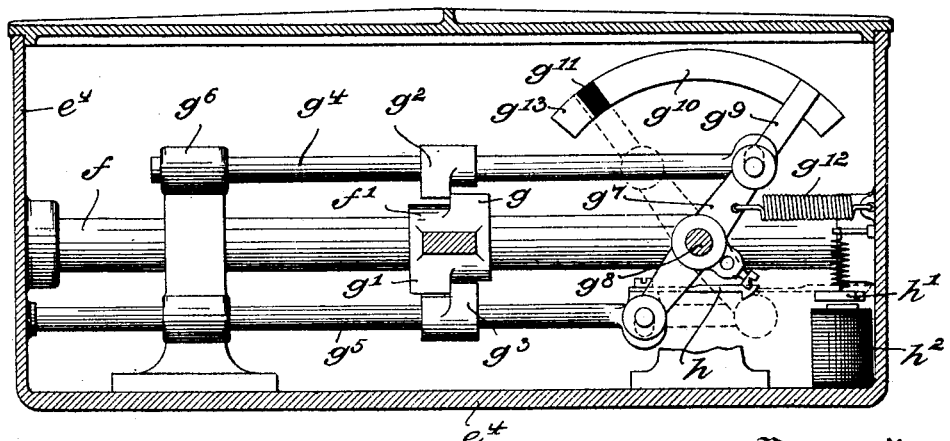

Figure 1 is a diagrammatic view of the mechanism embodying the main features of my invention and of the various circuits in which the various parts are located. Fig. 2 is a vertical sectional view of the upper portion of a controller-box, illustrating the upper end of the controller-cylinder, certain of its contact-fingers and contact-bands, and the pawl or pin constituting the preferred form of locking means. Fig. 3 is an enlarged detail view of the pawl or pin and its accessories, a portion of the controller-cylinder and its shaft being shown in section. Fig. 4 is a top or plan view of Fig. 3. Fig. 5 is a horizontal sectional view of Fig. 3, the plane of section being on the line $x\ x$ of Fig. 3. Fig. 6 is a top or plan view of the mechanism controlling the locking pawl or pin and of the connection between said mechanism and one of the axles of the car. Fig. 7 is a cross-sectional view on the line 7 7 of Fig. 6. Fig. 8 is a longitudinal sectional view on the line 8 8 of Fig. 6. Fig. 9 is a similar view on the line 9 9 of Fig. 6. Fig. 10 is a detail front view of catches adapted to lock certain portions of the mechanism in their normal position; and Fig. 11 is a longitudinal sectional view similar to Fig. 8, but illustrating a modified form of the mechanism.

Referring to the drawings, $a$ represents the controller-cylinder having a series of metallic contact-bands $a'$, adapted when the cylinder is rotated to be brought into contact with one or more of the contact-fingers $a^2$. The cylinder $a$ has the usual shaft $a^3$, to which is secured the handle $a^4$, by means of which the shaft $a^3$ and cylinder $a$ may be turned by the motorman. Within the cover $a^5$ and on the shaft $a^3$ is secured a notched locking-disk $b$ in addition to the usual ratchet $a^6$. Adjacent to the shaft $a^3$ and supported by a suitable bracket $d$ is placed an electromagnet $d'$, the armature-piece $d^2$ of which carries a pin $d^3$, sliding in suitable supports $d^4$, depending from the bracket $d$. The pin $d^3$ and the piece $d^2$ are normally shifted to the left or retracted away from the disk $b$ by means of the spring $d^5$; but when the armature $d^2$ is attracted by the energization of the electromagnet $d'$ this pin $d^3$ is shifted to the right and acts as a pawl against the teeth of the disk $b$ to prevent the disk and shaft $a^3$ from turning in a direction to bring the controller-cylinder so that its bands may make the necessary contacts with the contact-fingers. The pin or pawl $d^3$ is designed to be shifted into locking engagement with the disk $b$ immediately after the handle $a^4$ has been shifted to a point or mark in the series of marks indicating the various combinations to be made by the controller-cylinder and is designed to lock said disk, the shaft, and handle against further turning to a next succeeding point until a sufficient interval of time has elapsed to enable the car to acquire the necessary speed or headway to permit the application of such an increase of power as the combination of said next succeeding point is designed to supply. In my present invention the arrangement is such that the speed of the car controls the movement of the pin or pawl away from the disk by permitting the electromagnet $d'$ to be demagnetized only at the instant when the car has acquired sufficient headway. In carrying out this feature of my invention I prefer to use the following mechanism:

Referring particularly to Figs. 6 to 10, inclusive, to an axle $e$ of the car is secured a miter-gear $e'$, meshing with a similar gear-wheel $e^2$, secured to the end of a shaft $e^3$. The shaft $e^3$ is supported in a box $e^4$, depending from the bottom of the car, and is screw-threaded, as at $e^5$. Upon a rod or fulcrum $f$, within the box $e^4$, is pivotally supported a sleeve or hub $f'$, adapted to slide back and forth on said rod $f$, as hereinafter described. From one side of the sleeve or hub $f'$ projects an arm $f^2$, carrying a half-nut $f^3$, the threads of which are adapted when the arm $f^2$ is swung downward to engage the threaded shaft $e^3$, as indicated in dotted lines in Fig. 7. From the other side of the sleeve or hub $f'$ extends the arm $f^4$, having an eye $f^5$, adapted to inclose and slide over a rod $f^6$. This rod $f^6$, as illustrated in Fig. 9, is supported in the ends $f^7 f^7$ of a bracket-piece $f^8$, which bracket-piece is adapted to slide up and down in suitable guides $f^9$ in the side walls of the box $e^4$. The bracket $f^8$ is connected, as at $f^{10}$, to the core $f^{11}$ of a solenoid $f^{12}$, which solenoid when energized is adapted to lift the core $f^{11}$, bracket $f^8$, and rod $f^6$ to thereby tilt the half-nut $f^3$ down into engagement with the threaded shaft $e^3$. The weight of the bracket $f^8$ and rod $f^6$ is sufficient to be normally depressed unless the solenoid be energized. Referring now to Figs. 6, 7, and 8, the hub or sleeve $f'$ is provided with an upper and a lower projection $g$ and $g'$, each of which is adapted to engage a correspondingly-formed projection $g^2$ or $g^3$, formed on the parallel shifting rods $g^4$ and $g^5$. These rods $g^4$ and $g^5$ are supported by and slide in a suitable standard $g^6$ and are each secured at one end to the ends of a switch-lever $g^7$, pivoted, as at $g^8$, to a stationary portion of the box $e^4$ or its contents at a point midway of the points to which the sliding rods $g^4$ and $g^5$ are secured to said lever. The lever $g^7$ has a contact end $g^9$, sliding over a contact-sector $g^{10}$, having on its face, as at $g^{11}$, an insulated strip which is of less width than the width of the contact end $g^9$ and divides the sector into two separate contacts $g^{10}$ and $g^{13}$. The lever $g^7$ is normally retracted, as indicated at Fig. 8, so that its end $g^9$ is away from the insulated piece or strip $g^{11}$, by means of a spring $g^{12}$, and in this normal position the sleeve or hub $f'$ and the projections $g^2$ and $g^3$ of the rods $g^4$ and $g^5$ all occupy a central or inoperative position. The lower rod $g^5$ carries a catch $h$, which when the lever $g^7$ is shifted toward the insulated strip $g^{11}$ is adapted to approach and engage an armature $h'$ of an electromagnet $h^2$. When the catch $h$ is thus engaged, the lever $g^7$ is locked in the position against the tension of its spring $g^{12}$ indicated by the dotted lines in Fig. 8. When the electromagnet $h^2$ is energized, the armature $h'$ is attracted and brought out of engagement with the catch $h$ to thereby release the lever $g^7$ and permit it to respond to the tension of its spring.

Referring again to Figs. 6 and 7, upon the eye $f^5$ of the arm $f^4$, which projects from the hub or sleeve $f'$, is secured a contact-piece $k$, adapted when the half-nut $f^3$ is depressed and the arm $f^4$ elevated to engage a rod $k'$ for a purpose hereinafter set forth.

The operation of the device will be clearly understood by reference to Fig. 1. The main circuit through the motor passes from trolley-wire 1, trolley 2, switches 3 3 to the lever $g^7$, from whence it passes when the lever is in retracted position to the sector $g^{10}$, and thence to the solenoid $f^{12}$, and through the same to a contact-finger $a^2$. When the controller-cylinder is turned to bring a second finger $a^2$ into contact, the current passes through said finger to the motor and from the motor to the rail 4. The passage of the current through the solenoid $f^{12}$ energizes said solenoid and its core is lifted upward. As previously explained, the elevation of the core $f^{11}$ causes the half-nut $f^3$ to be tilted down into engagement with the shaft $e^3$, and the sleeve or hub $f'$ begins to slide on the rod $f$. The sliding of the hub $f'$ shifts the parallel rods $g^4$ and $g^5$, so as to throw the lever $g^7$ across the sector $g^{10}$ until it rests on and completes the circuit through the section $g^{13}$ of said sector. When this occurs, the solenoid is cut out of the main circuit, its core $f^{11}$ falls, and the nut $f^3$ is lifted out of engagement with the shaft $e^3$. When the solenoid is so cut out, the current passes from the lever $g^7$ to the section $g^{13}$ of the sector $g^{10}$ and thence direct to one of the contact-fingers $a^2$. While the solenoid remains energized and its core $f^{11}$ is elevated the contact-strip $k$ is elevated into contact with the rod $k'$. This makes or completes a branch circuit, in which the magnet $d'$, controlling the locking-pin $d^3$, is included. This circuit starts or branches from a contact-finger $a^2$ by line 5 to and through the magnet $d'$ and thence by line 6 to the rod $k'$. From the rod $k'$ the current travels through the contact $k$ and arm $f^4$ by the wire 7 to a rail 4. It will thus be seen that so long as the solenoid is included in the main circuit the branch circuit through magnet $d'$ is complete and said magnet is energized. The locking-pin $d^3$ will thus be slid into locking engagement with the disk $b$ and maintained in such engagement until the branch circuit is broken by the fall of the contact-piece $k$. This occurs only when the solenoid is demagnetized, which may occur either when the current is shut off altogether or when the lever $g^7$ has been moved by the shaft $e^3$ sufficiently to clear the insulated strip $g^{11}$ of the sector $g^{10}$. It will thus be seen that the disk $b$ will remain locked for an interval of time, depending upon the travel of the lever $g^7$ over the sector $g^{10}$, and the travel of this lever $g^7$ depends upon the rotation of the shaft $e^3$, which, as previously explained, is geared to one of the car-axles. The disk $b$ will therefore be locked until the speed or travel of the car has been sufficient to cause the lever $g^7$ to traverse the sector, and during this interval of time the shaft $a^3$ of the controller cannot be turned forward.

As hereinbefore explained, the lever $g^7$ is locked by the catch $h$ and armature $h'$ in that position wherein the solenoid has been cut out. Before the lever $g^7$ can return to its normal position to include the solenoid in the main circuit the catch $h$ must be released from said armature $h'$. To provide for this contingency, there is fastened upon the shaft $a^3$ of the controller-cylinder $a$ the disk $m$, having a series of fingers or projections $m'$. These fingers are so arranged that they control the various points or marks to which the handle may be moved before the disk $b$ will be locked. In the drawings the fingers $m'$ are so arranged as to correspond to the usual points, and hence the handle can be only moved point by point, there being a locking of the shaft at every point. By cutting off one or more of the intermediate fingers $m'$ it will be readily understood that the locking of the shaft may be so arranged as to take place only after two or three points have been indicated by the handle. The fingers $m'$ serve to complete a branch circuit in which the magnet $h^2$ is located by connecting two contact-strips $m^2$ and $m^3$ together. These contact-strips $m^2$ and $m^3$ form the terminals of a circuit proceeding as follows: One strip $m^2$ is fed by the branch wire 8 from a contact-finger $a^2$, and the other strip $m^3$ is connected by a wire 9 with one terminal of the coil forming the magnet $h^2$. The other terminal of said coil is connected by the wire 10 with a rail 4 or to the ground. When the shaft $a^3$ of the controller-cylinder has been turned sufficiently to bring a finger $m'$ into contact with the strips $m^2$ and $m^3$, the magnet $h^2$ will at that instant be energized and its armature $h'$ will be attracted. The catch $h$ will be released and the lever $g^7$ returned by the spring $g^{12}$ to its normal position, in which the solenoid $f^{12}$ is included in the main circuit. To insure that the lever $g^7$ when retracted by its spring $g^{12}$ will always shift the nut $f'$ to its central or inoperative position, two spring-catches $o$ $o$, Figs. 6, 7, and 10, are secured to the side of the box $e^4$ and will receive and lock the arm $f^2$, carrying said nut.

In Fig. 11 a modification is shown in which the extent of travel of the lever $g^7$ over the sector $g^{10}$ may be regulated by advancing or retracting the rod $g^4$ and locking the same in its advanced or retracted position by means of the two nuts $p$ and $p'$. If the extent of travel of this lever $g^7$ be halved, it will be readily understood that fewer revolutions of the shaft $e^3$ will be required to bring the lever over to the section $g^{13}$ of the sector to cut out the solenoid, and hence the car need not travel so far as heretofore before the pin $d^3$ can be released from the disk $b$.

Having thus described the nature and objects of my invention, what I claim as new, and desire to secure by Letters Patent, is—

1. In a controller, the combination with the controller-cylinder and its shaft, of means for locking said shaft and cylinder against movement in one direction and mechanism controlled by the travel of the vehicle for releasing said locking means, substantially as and for the purposes described.

2. In a controller, the combination with the controller-cylinder, its shaft and a notched locking-disk secured to said shaft, of a pawl, an electromagnet adapted when energized to advance said pawl into engagement with said disk and means controlled by the travel of the vehicle for deënergizing said magnet to release said pawl from said disk, substantially as and for the purposes described.

3. In a controller, the combination with the controller, its shaft and a notched locking-disk secured to said shaft, of a pawl, a spring adapted to retract said pawl, an electromagnet adapted when energized to advance said pawl against the tension of its spring into engagement with said disk and mechanism controlled by the travel of the vehicle for deënergizing said magnet, substantially as and for the purposes described.

4. In a controller, the combination with the controller-cylinder, its shaft and means for locking said shaft and cylinder against movement in one direction, of a solenoid normally included in the main circuit of the controller and adapted to be energized thereby, said solenoid adapted when energized to control said locking means, and means, controlled by the travel of the car, for bringing said solenoid into and out of said main circuit, substantially as and for the purposes described.

5. In a controller, a controller-cylinder located in the main circuit, a shaft carrying said cylinder, a notched disk located on said shaft, a pawl adapted to engage said disk and to thereby lock the shaft from turning in one direction, an electromagnet included in a branch circuit and adapted when energized to advance the pawl into locking engagement with said disk and a solenoid included in the main circuit and adapted when energized to complete the branch circuit and energize said electromagnet, substantially as and for the purposes described.

6. In a controller, a controller-cylinder located in the main circuit, a shaft carrying said cylinder, a notched disk located on said shaft, a pawl adapted to engage said disk to lock the same and the shaft against movement in one direction, an electromagnet included in a branch circuit and adapted when energized to advance the pawl into locking engagement with the disk, a solenoid normally included in the main circuit and adapted when energized to complete the branch circuit and energize said electromagnet and means controlled by the travel of the vehicle for automatically cutting said solenoid out of the main circuit, substantially as and for the purposes described.

7. In a locking means for controller-shafts, an electromagnet controlling said locking means, a solenoid included in the main circuit and controlling the magnet, and a lever controlled by the travel of the car and adapted to automatically cut said solenoid out of the main circuit, substantially as and for the purposes described.

8. In a locking means for controller-shafts, an electromagnet controlling said locking means, a solenoid included in the main circuit and controlling the magnet, a lever, means controlled by the travel of the car to advance said lever and to thereby cut said solenoid out of the main circuit, means for locking said lever in its advanced position, and means controlled by the controller-shaft for releasing the lever-locking means when said controller-shaft is turned, substantially as and for the purposes described.

In testimony whereof I have hereunto set my signature in the presence of two subscribing witnesses.

WILLIAM H. CONRAD.

Witnesses:
J. WALTER DOUGLASS,
THOMAS M. SMITH.